United States Patent

[11] 3,631,408

[72] Inventors Masaharu Kubo
Hachioji-shi;
Minoru Nagata, Kodaira-shi, both of Japan

[21] Appl. No. 857,824
[22] Filed Sept. 15, 1969
[45] Patented Dec. 28, 1971
[73] Assignee Hitachi, Ltd.
Chiyoda-ku, Tokyo, Japan
[32] Priority Sept. 13, 1968
[33] Japan
[31] 43/65583

[54] CONDENSER MEMORY CIRCUIT WITH REGENERATION MEANS
11 Claims, 12 Drawing Figs.

[52] U.S. Cl. .................................................. 340/173 CA, 307/205, 307/238
[51] Int. Cl. .................................................. G11c 7/00, G11c 11/24
[50] Field of Search .......................................... 340/173 R, 173 CA; 307/205, 279, 304, 238

[56] References Cited

UNITED STATES PATENTS

| | | | |
|---|---|---|---|
| 3,576,571 | 4/1971 | Booher | 340/173 R |
| 2,771,575 | 11/1956 | Hampton | 340/173 X |

*Primary Examiner*—Bernard Konick
*Assistant Examiner*—Stuart Hecker
*Attorney*—Craig, Antonelli & Hill ABSTRACT: A condenser memory circuit comprising a condenser in which information is stored as an electric charge, and means closed by application of a regenerative instruction pulse of a certain specific period under the condition that the electric charge is stored in said condenser, said means connecting a regeneration power source to said condenser; said condenser memory circuit characterized in that when a stored charge is present in the condenser, the stored charge is regenerated at each regenerative instruction pulse by the regeneration voltage supplied from said regeneration power source.

INVENTORS

MASAHARU KUBO and MINORU NAGATA

BY Craig, Antonelli, Stewart & Hill

ATTORNEYS

Patented Dec. 28, 1971 3,631,408

4 Sheets-Sheet 2

INVENTORS

MASAHARU KUBO and MINORU NAGATA

BY Craig, Antonelli, Stewart & Hill

ATTORNEYS

INVENTORS
MASAHARU KUBO and MINORU NAGATA

BY Craig, Antonelli, Stewart & Hill
ATTORNEYS

INVENTORS

MASAHARU KUBO and MINORU NAGATA

BY Craig, Antonelli, Stewart & Hill

ATTORNEYS

CONDENSER MEMORY CIRCUIT WITH REGENERATION MEANS

BACKGROUND OF THE INVENTION

This invention relates to improvements in a condenser memory circuit used for an electronic computer and the like.

The conventional condenser memory circuit, which includes a condenser and a switch, is operated in such a manner that information is written into or read out from the condenser by closing the switch. This memory circuit is used as the temporary memory of random access type of which the construction is simple and access time is short. With this type of memory circuit, however, the information is lost with lapse of time due to the leakage resistance of the condenser. For this reason, the condenser memory circuit of this type has not been used as the static hold-type memory. Furthermore, with the conventional memory circuit, it is very difficult, or almost impossible, to realize a nondestructive read out.

Recently, a shift register of the clock drive-type has been developed and put to use. This shift register is such that insulated gate field effect transistors, such as metal-oxide-semiconductor field effect transistors (hereinafter referred to briefly as "MOST"), are connected in multistage, input information is stored in the input gate condenser of the first stage MOST, and the stored information is shifted to the next stage MOST by the clock pulse.

The shift register is considered as a kind of condenser memory in view of the fact that the condenser of the insulated gate is utilized as the memory. However, this shift register is a temporary memory of the dynamic type in which the information is transmitted successively. Hence, it is impossible to use this register as a static hold-type memory or as a random access-type memory.

SUMMARY OF THE INVENTION

An object of this invention is to provide a condenser memory circuit which possesses a regenerative function.

Another object of the invention is to provide a condenser memory circuit which can be used as a static hold-type memory.

Another object of this invention is to provide a condenser memory circuit which can be used as a random access-type memory which can provide a nondestructive readout.

Still another object of the invention is to provide a regenerative condenser memory circuit which can be easily formed into an integrated circuit.

This invention is realized by associating a switching means with a conventional condenser memory circuit having a condenser and a switch which is closed by the address instruction pulse; and said switching means of which is closed when a stored charge is present in the condenser and a regenerative instruction pulse of a specific period is generated.

DETAILED DESCRIPTION OF THE INVENTION

Figure 1:
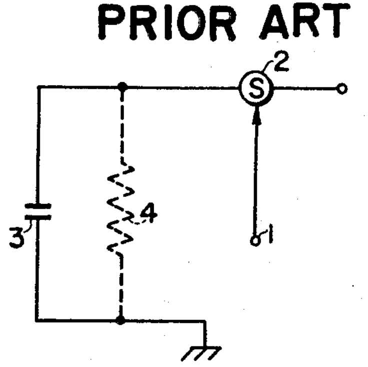
FIG. 1 PRIOR ART
FIG. 1 is a schematic diagram showing a conventional condenser memory circuit.

FIG. 1 shows a conventional memory circuit, which consists of a condenser 3 and a switch 2. The switch 2 is turned on by address instruction pulse applied to the terminal 1, whereby information is written in or read out from the condenser 3. In fact, however, the written information is eventually lost due to the leakage resistance 4 of the condenser 3 with lapse of time. This is the reason why this type of memory has not been used as a static hold-type memory and it has been impossible to read out the stored information nondestructively from the memory.

Figure 2:
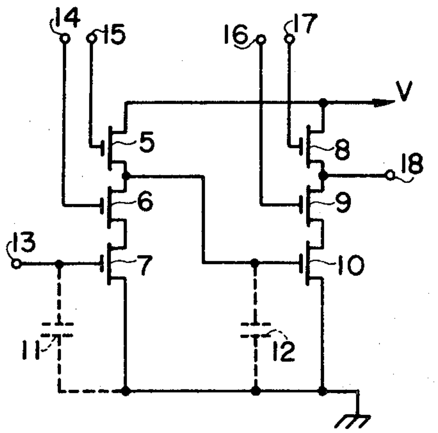
FIG. 2 PRIOR ART
FIG. 2 is a circuit diagram showing a conventional clock drive-type shift register using insulated gate field effect transistors.

A clock drive-type shift register, as shown in FIG. 2, comprising insulated gate field effect transistors 5, 6, 7, 8, 9 and 10, has hitherto been in use. According to this shift register, an input applied to the terminal 13 is stored in the input gate condenser 11 of the transistor 7, the inverse signal of the stored information is stored in the input gate condenser 12 of the transistor 10 by the clock pulses applied to the terminals 14 and 15, and the information stored in the condenser 11 is read out via the terminal 18 by the clock pulses applied to the terminals 16 and 17.

This shift register can be considered as a kind of condenser memory in view of the fact that the condenser of the insulated gate is utilized as a memory. Substantially, however, this shift register is a dynamic type temporary memory functioning for successive transmission of information. Therefore, such a shift register can neither be used as a static hold-type memory, as in the case of the memory shown in FIG. 1, nor as a random access type memory.

Figure 3:
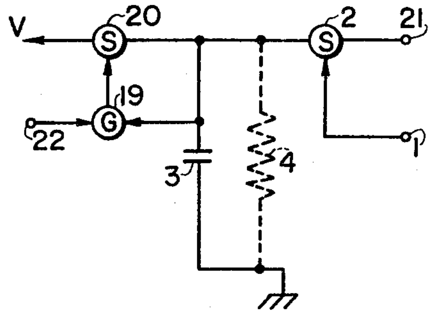
FIG. 3 is a schematic circuit diagram showing a condenser memory circuit according to this invention.

FIG. 3 illustrates the principle of this invention, wherein the numeral reference 19 denotes a gate circuit, 20 is a switch, 21 is a terminal to which an input information is applied and from which the stored information is derived, 22 is a terminal to which a regenerative instruction pulse is applied, V is a power source for regeneration use, and other symbols denote the same components as in FIG. 1.

For writing-in information, the switch 2 is closed by the address instruction pulse applied to the terminal 1, and input information from the terminal 21 is stored in the condenser 3.

Now, assume that a stored charge is present across the condenser 3 (this state is considered "1"). A regenerative instruction pulse is applied periodically to the terminal 22, and a gate output is derived from the gate circuit 19 due to the stored charge across the condenser 3, the switch 20 is closed by this gate output, thereby connecting the regeneration power source V to the condenser 3 and thus regeneratively storing the "1" signal in the condenser 3. When no information is stored therein (this state is considered "0"), no output is derived from the gate circuit 19 even when applying the regenerative instruction pulse thereto, and the switch 20 remains opened, the regeneration power source V is disconnected from the condenser 3, and the state of the condenser 3 remains unchanged.

In short, the gate circuit 19 monitors the storing state of the condenser 3 each time the regenerative instruction pulse is applied thereto, and delivers an output according to whether the stored charge is present across the condenser 3 or not. Then, the switch 20 is closed or opened by said output to connect or disconnect the condenser 3 to or from the regeneration power source V, thereby carrying out information regeneration.

For reading-out information, the address instruction pulse is applied again to the terminal 1 to close the switch 2, and the information stored in the condenser 3 is read out via the terminal 21 and, at the same time, the regenerative instruction pulse is applied to the terminal 22, thereby deriving an output from the gate circuit 19 according to the storing state of the condenser 3, and the switch 20 is closed or opened by said output to connect or disconnect the condenser 3 to or from the regeneration power source V, thereby holding the storing state of the condenser 3.

According to this arrangement, therefore, the information storing state can be held by the information regeneration function by suitably determining the period of regenerative instruction pulse, even when a leakage resistance 4 is in parallel with the condenser 3 or when a read operation is performed. This memory circuit can therefore be used not only as a static hold-type memory but also as a nondestructive read out-type memory.

The above operation is an example of the situation where a signal voltage is stored in the condenser 3 when the information state is "1." It is needless to say that a signal voltage may be stored therein when the information state is "0."

Figure 4:
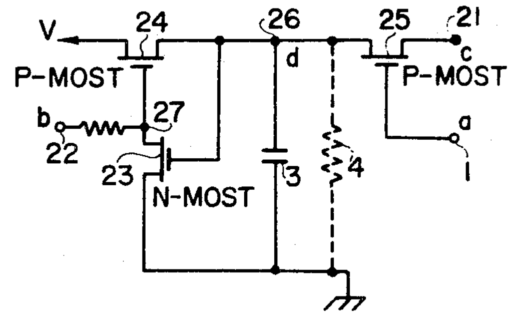
FIG. 4 is a circuit diagram showing a condenser memory circuit embodying this invention.

FIG. 4 is a circuit diagram showing an embodiment of this invention, wherein insulated gate field effect transistors of both P and N channels, such ans P and N channel metal-oxide-semiconductor field effect transistors, are used for the switches 2 and 20 and gate 19 of FIG. 3. Specifically, the gate circuit 19 as shown in FIG. 3 is formed by the N-channel depletion mode metal-oxide-semiconductor field effect transistor 23 (briefly, N-MOST), and the switches 20 and 2 are formed by P-channel enhancement mode metal-oxide-semiconductor field effect transistors 24 and 25 (briefly, P-MOST).

Figure 5:
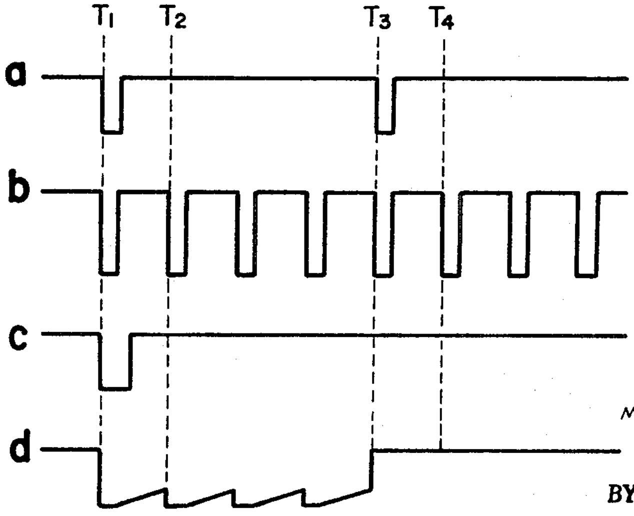
FIG. 5 shows waveforms of the circuit of FIG. 4.

FIG. 5 shows waveforms of the circuit of FIG. 4, wherein *a* is an address instruction pulse applied to the terminal 1, *b* is a regenerative instruction pulse applied to the terminal 22, *c* is an input information signal applied to the terminal 21, and *d* is the voltage across the condenser 3.

For writing-in information using the circuit of FIG. 4, a negative address instruction pulse, as shown by *a* of FIG. 5, which is applied to the terminal 1 is used to turn on the transistor 25, and a charge is stored or not stored in the condenser 3 according to the state "1" or "0" of the information from the terminal 21.

Assume that an address instruction pulse *a* is applied thereto at time T1 as shown in FIG. 5, and an input information signal applied to the terminal 21 is of a negative potential as shown by *c* (this information signal is considered "1"). Under this condition, the condenser 3 is negatively charged, and the potential at the point 26 becomes negative as shown by *d* of FIG. 5.

After the time T1 and when the address instruction pulse time passes, the condenser 3 starts releasing its charge through the leakage resistance 4 which is present in parallel with the condenser 3, and thus the potential at the point 26 is raised. The transistor 23 is nonconducting during the time the potential at the point 26 is negative. Under this condition, when a regenerative instruction pulse, as shown by *b* of FIG. 5, is applied thereto from the terminal 22 at time T2, the regenerative instruction pulse *b* is applied directly to the gate of the transistor 24 since the transistor 23 is in the nonconducting state, and thus the transistor 24 turns on. As a result, the regeneration power source V is connected to the condenser 3, the condenser 3 is charged by the current from the regeneration power source V, and the potential at the condenser 3 is regenerated to the initial value. When the regenerative instruction pulse is periodically applied thereto in the same manner as above, the transistor 24 turns on each time the regenerative instruction pulse is applied, the regeneration power source V is connected to the condenser 3, and the stored voltage across the condenser 3 is regenerated.

When an address instruction pulse *a* is applied thereto at time T3, as shown in FIG 5, and, at this instant, if the input information applied to the terminal 21 is of zero potential as shown by *c* (this information is considered "0"), the condenser 3 is not charged, the potential at the point 26 becomes zero, as shown by *d* of FIG. 5, and thus the transistor 23 turns on. After T3 and when it reaches T4, a regenerative instruction pulse, as shown by *b* of FIG. 5, is applied from the terminal 22. By the time, however, since the transistor 23 is already in the conducting state, the gate of the transistor 24 is kept at zero potential, the transistor 24 remains in the nonconducting state, the condenser 3 is kept at zero potential.

In this case, the regenerative instruction pulse is of negative potential and its value is determined to be larger than the sum of the information level of "1" and the threshold voltage level of the transistor 24.

The reading out of information is done in the following manner. An address instruction pulse is applied again to the terminal 1 to turn on the transistor 25, and the charge on the condenser 3 is read out via the terminal 21. At the same time, a regenerative instruction pulse is applied to the terminal 22, thereby regenerating the condenser 3 and thus reading out the information nondestructively.

Figure 6:
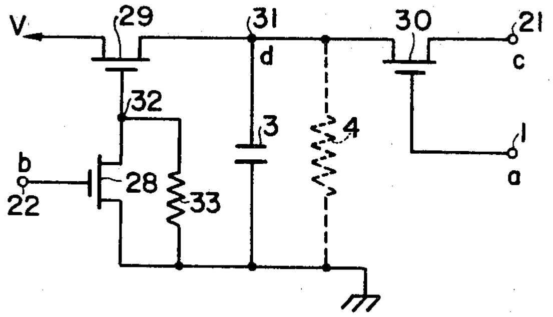
FIG. 6 is a circuit diagram showing another condenser memory circuit embodying this invention.

FIG. 6 shows another embodiment of this invention, wherein the memory circuit is constituted by a P-channel insulated-gate-field-effect transistor (such as P-MOST) and a condenser, in order to facilitate formation of an integrated circuit.

In other words, the gate circuit 19 and the switches 20 and 2 of FIG. 3 are constituted by the same P-MOSTs 28, 29 and 30.

Figure 7:
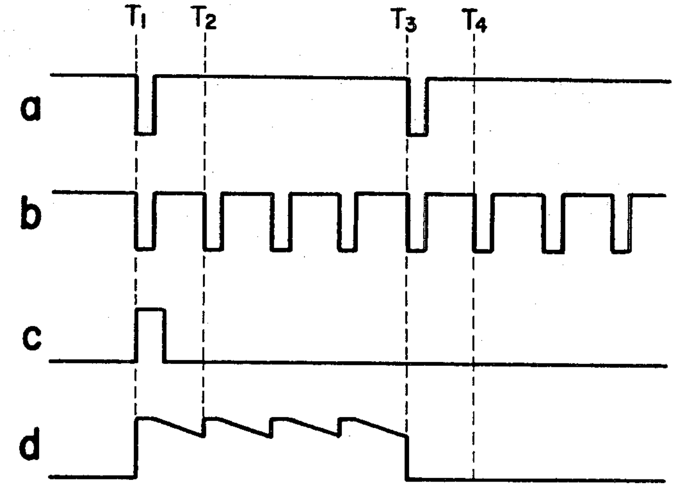
FIG. 7 shows waveforms of the circuit of FIG. 6.

FIG. 7 shows waveforms of the circuit of FIG. 6; *a* is an address instruction pulse applied to the terminal 1, *b* is a regenerative instruction pulse applied to the terminal 22, *c* is an input information applied to the terminal 21, and *d* is a potential at the point 31.

The operation of the circuit of FIG. 6 will be explained by referring to the waveforms shown in FIG. 7.

When an address instruction pulse is applied to terminal 1 at time T1 as shown in FIG. 7, the transistor 30 turns on. At this instant, if the input information applied to the terminal 21 is of positive potential as shown by *c* of FIG. 7 (this information is assumed to be "1"), the condenser 3 is charged, and the potential at the point 31 becomes positive, as shown by *d* of FIG. 7.

After the time T1, when the period of the address instruction pulse *a* passes, the condenser 3 starts discharging due to the leakage resistance 4 which is in parallel with the condenser 3, and the potential at the point 31 is reduced gradually. Then, when a regenerative instruction pulse as shown by *b* of FIG. 7 is applied to the terminal 22 at time T2, the transistor 28 turns on. As a result, the charging voltage of the condenser 3 is applied negatively between the gate and source of the transistor 29, thereby turning on the transistor 29. Accordingly, the regeneration power source V is connected to the condenser 3 and the condenser 3 is charged again by the regeneration voltage from the regeneration source V. Thus, the condenser 3 is regenerated to nearly the initial voltage. When the regenerative instruction pulse is periodically applied thereto in the same manner as above, the transistor 29 turns on successively, the regeneration source V is connected to the condenser 3, and thus the stored voltage across the condenser 3 is regenerated.

When an address instruction pulse *a* is applied thereto at time T3, the condenser 3 is not charged if the input information applied to the terminal 21 is zero potential, as shown in FIG. 7 at *c* (this information is considered to be "0"). Consequently, the potential at the point 31 becomes zero, as shown by *d* of FIG. 7. At time T4, a regenerative instruction pulse, as shown by *b* of FIG. 7, is applied to terminal 22, and the transistor 28 becomes conducting. However, since the condenser 3 is not charged, the transistor 29 remains in the nonconducting state, and the potential at the point 31 is kept at zero.

To read out information, an address instruction pulse is applied again to the terminal 1, to turn on the transistor 30, and the charge on the condenser 3 is read out via the terminal 21. At the same time, a regenerative instruction pulse is applied to the terminal 22, thereby regenerating the stored information in the condenser 3 and thus the information is read out nondestructively.

As shown in FIG. 6, the gate electrode of the transistor 29 is grounded through the resistor 33. The purpose of this arrangement is to make the potential at the point 32 into zero when the transistor 28 is in the nonconducting state.

The above embodiment is an example where the transistors 28, 29 and 30 are made up of P-MOST. Instead of P-MOST, the N-channel insulated-gate field-effect transistor, such as N-MOST, may be used for the same purpose. In this case, it is necessary that the address instruction pulse and regenerative instruction pulse be of positive polarity, while the input information is of negative potential or zero potential, and the regeneration voltage source is of negative potential.

Figure 8:
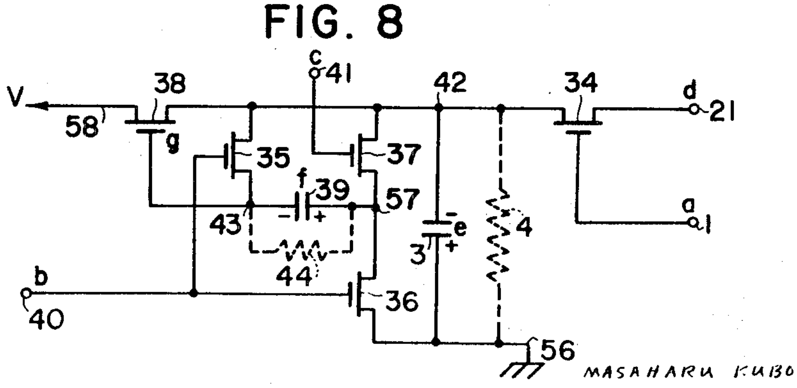
FIG. 8 is a circuit diagram showing still another condenser memory circuit embodying this invention.

FIG. 8 shows still another embodiment of this invention. This circuit consists of P-channel insulated-gate field-effect transistors 34, 35, 36, 37 and 38 and condensers 3 and 39. The basic principle of operation is such that the transistor 38 is turned on-off by controlling the charging voltage of the second condenser 39 whereby the same regenerative function as in the circuit of FIG. 4 is carried out. The operating principle of this circuit will be more specifically explained by referring to various timing instructions and signal trains shown in FIG. 9.

Figure 9:
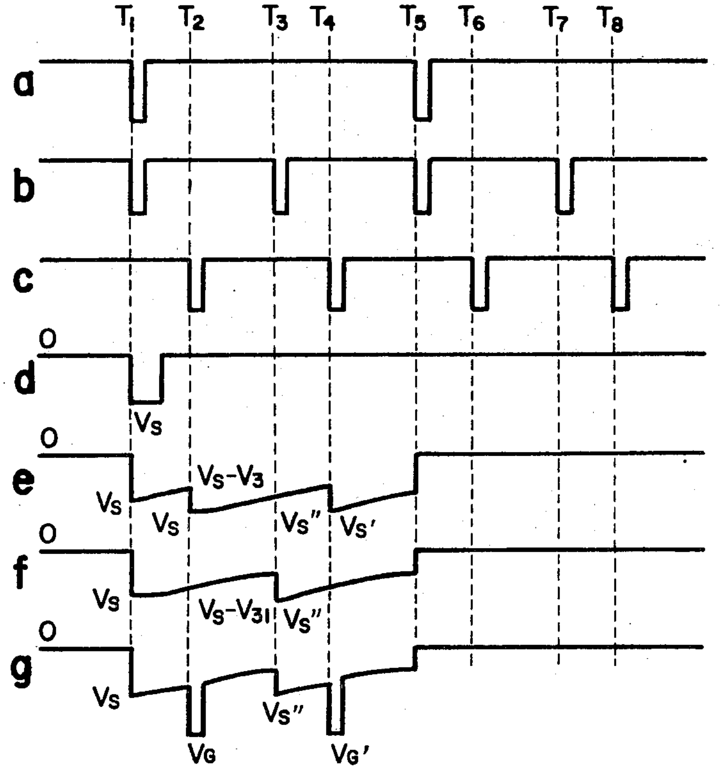
FIG. 9 shows waveforms of the circuit of FIG. 8.

In FIG. 9, *a* represents an address instruction pulse applied to the terminal 1, *b* is a regenerative instruction A pulse applied to the terminal 40, *c* is a regenerative instruction B pulse applied to the terminal 41, *d* is an input information pulse applied to the terminal 21, *e* is a potential at the point 42, *f* is a potential difference across the condenser 39, and *g* is a potential at the point 43.

A. WRITING-IN AND REGENERATING OPERATION

I. At Time T1

The address instruction pulse *a* is delivered to the terminal 1 to turn on the transistor 34, and the condenser 3 is negatively charged by the input information *d* (assumed to be "1") whereby the information "1" is written. Accordingly, the potential *e* at the point 42 becomes a negative potential Vs. On the other hand, the regenerative instruction A pulse *b* is delivered to the terminal 40, synchronized with the address instruction pulse *a*, to turn on the transistors 35 and 36, and the condenser 39 is charged to a negative voltage Vs. As a result, the potential *f* at the point 43 becomes a negative potential V*s*

II. Period T1–T2

During this period, the condensers 3 and 39 release their charges due to the leakage resistances 4 and 44 which are present in parallel with the condensers 3 and 39, respectively, and consequently the charging voltages across the condensers 3 and 39 come down slightly. Namely, the potentials *e* and *f* at the points 42 and 43 are raised slightly from V*s* to the positive side.

Assuming that the charging voltages across the condensers 3 and 39 are V3 and V39 respectively during the period T1 to T2, the charging voltages *e* and *f* of the condensers 3 and 39 at time T2 will become V*s* V3 and V*s* V39 respectively.

III. At Time T2

The regenerative instruction B pulse at *c* is delivered to terminal 41, to turn on the transistor 37. Thus, the condensers 3 and 39 are connected in series. Accordingly, the gate voltage of the transistor 38 (namely, the potential at the point 43) will be: $VG=2Vs-V3-V39$ ..........................(1)
When the threshold voltage of the transistor 38 is assumed $V_{TH}$, and if the value of VG of Eq. (1) satisfies the relationship $| Vs\ V3+V_{TH} | < | VG |$, the transistor 38 switches into the conducting state, and the voltage *e* of the condenser 3 is charged finally to the value: $Vs'=VG-V_{th}$ In this case, if $| Vs | > | V_{TH}+V+V39 |$ then, the relationship $| Vs' | > | Vs |$ *is established. Under this condition, it is possible to regenerate the information.*

IV. PERIOD T2–T3

During this period, the charging voltages of the condensers 3 and 39 keep decreasing, similar to the state as in (II) above. For the condenser 3, the value of *Vs' and the period T2–T3 are determined so that the charging voltage at time T3, namely the potential Vs'' at the point 42, is made equal to the initial value Vs.*

V. AT TIME T3

The regenerative instruction A pulse at *b* comes therein again, to turn on the transistors 35 and 36, and the condensers 3 and 39 are connected in parallel with each other. By this time the potential differences at the condensers become nonexistent, and the charging voltage *f* of the condenser 39 becomes Vs,'' which is equal to the charging voltage *e* of the condenser 3. The potential *f* at the point 43 becomes equal to the charging voltage *e*.

VI. PERIOD T3–T4

The operation for this period is nearly the same as in (II) above.

VII. At Time T4

The operation at this period is nearly the same as in (III) above. A voltage VG' (=VG) by the charging voltages of the condensers 3 and 39 is applied to the point 43. Thus, the transistor 38 is turned on and the condenser 3 is charged up to the voltage VS'.

VIII. Period T4–T5

The operation for this period is nearly the same as in (IV) above.

IX. Period T5–T8

As described above, the condenser 3 is charged (namely, the state of information "1") during the period T1–T5. While, during the period T5–T8, the state of information "0" is established in the following manner. At time T5, the address instruction pulse *a* comes in and the transistor 34 becomes conducting. However, since the input information *d* is of zero potential, there is no charged potential at the condenser 3 and, therefore, the potential *e* at the point 42 is zero. At the same time when the address instruction pulse *a* comes in, the regenerative instruction A pulse at *b* comes in, and thus the transistors 35 and 36 becomes conducting, and the condenser 3 is connected in parallel with the condenser 39. However, there is no charged voltage across the condenser 39. In other words, the voltage across the condenser 39 is zero. Then, at time T6, the regenerative instruction B pulse at *c* comes in. Since there is no charged potential at the condensers 3 and 39, the potential *g* at the point 42 becomes zero. As a result, the transistor 38 remains in the nonconducting state.

At times T7 and T8, the condensers 3 and 39 maintain zero potential as in the cases at times T5 and T6. These timings (regenerative instruction A and B pulses) are exactly the same as each other. Nevertheless the potential *g* at the point 43 remains zero and the transistor 38 is kept nonconducting. Accordingly, the condenser 3 has no charging voltage, or in other words, the condenser 3 holds the "0" level.

B. READING-OUT OPERATION

When the address instruction pulse is applied to the terminal 1 and simultaneously the regenerative instruction B pulse at *c* is applied to the terminal 41, synchronized with the address instruction pulse, the transistor 34 is turned to the conducting state and thus it becomes possible to read out the information stored in the condenser 3 by way of the terminal 21. At the same time, the transistor 37 becomes conducting, the charging voltages of the condensers 3 and 39 are applied to the point 43, the transistor 38 turns on or off according to whether the information is "1" or "0," thus carrying out the regeneration function. In this manner, it is possible to read out information nondestructively.

Figure 10:
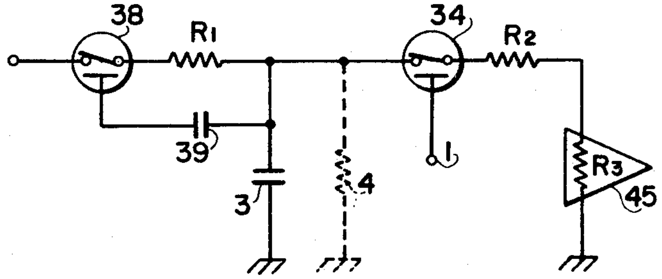
FIG. 10 is an equivalent circuit diagram showing the operation of information read out from the memory of FIG. 8.

FIG. 10 shows an equivalent circuit of FIG. 8 for operation to read out "1" information. In FIG. 10, assume that the internal resistance R1 of the transistor (switch) 38 is determined so that the relationship R1 < R2+R3 is established between the internal resistance R2 of the transistor (switch) 34 and the internal resistance R3 of the reading-out circuit 45. If so arranged, it becomes possible to regenerate the charging voltage of the condenser 3, and, therefore, nondestructive readout can also be realized.

Figure 11:
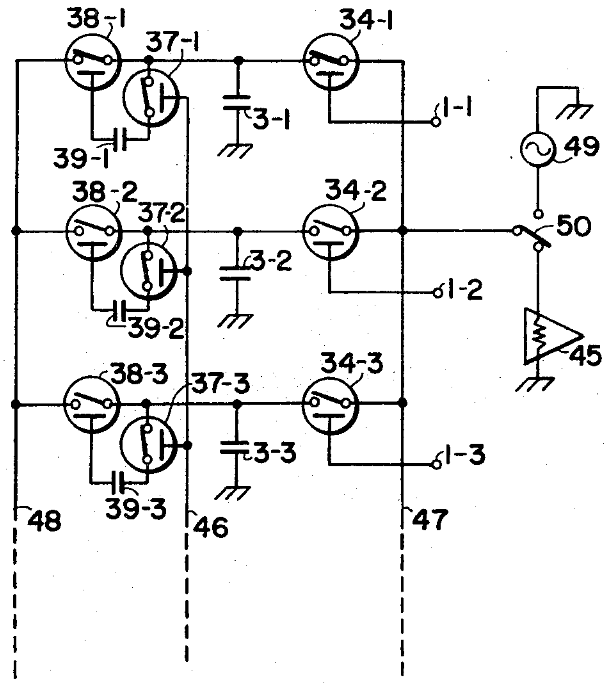
FIG. 11 is an equivalent circuit diagram showing a memory composed of a plurality of memories as in FIG. 8.

FIG. 11 shows an equivalent circuit in which a plurality of the basic circuit cells of FIG. 8 are disposed in parallel to form a random access-type memory. Except for the address instruction lines 1—1, 1–2,....., the regenerative instruction A pulse line (not diagrammatically shown), regenerative instruction B pulse line 46, reading-out and writing-in line 47, and power source line 48 are arranged to be usable in common. The reading-out circuit 45 and write-in circuit 49 can be switched by the selector switch 50. To write in or read out the information to or from the specific basic cell, it is necessary that a pulse be applied to the corresponding address instruction line and the desired circuit be selected by the switch 50.

FIG. 11 shows the condition where the "1" information of the condenser 3–1 at the address 1 is read out by the pulse supplied to the address instruction line 1—1. Also, at the address 2, the transistor 38–2 is in the state of conduction in order to regenerate the "1" information in the condenser 3–2. At the address 3, the transistor 38–3 is in the nonconducting state in order to maintain the "0" information in the condenser 3—3.

In FIG. 11, the transistors 34–1, 34–2 and 34–3 and the reading-out circuit 45 are connected directly. It is needless to say that they may be connected by way of known buffers such as insulated gate field effect transistor, emitter follower, etc. whereby the influence of the load can be reduced.

Figure 12:
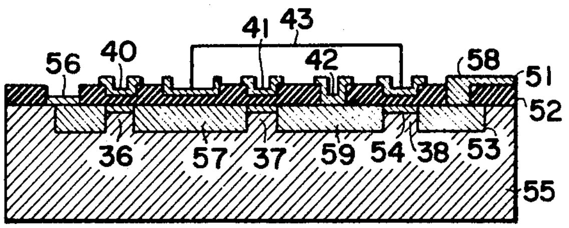
FIG. 12 is a sectional diagram showing a part of an integrated circuit formed in accordance with the circuit of FIG. 8.

FIG. 12 is a cross section diagram showing a part of an integrated circuit formed in accordance with the circuit of FIG. 8. In FIG. 12, the integrated circuit is composed of aluminum metal layer 51, Si0 insulating layer 52, P-type region 53, channel 54 and N-type substrate 55. Marks shown in FIG. 12 correspond to marks shown in FIG. 8.

The condenser 3 is formed by a PN-Junction capacitance between the P-type region 59 and the N-type substrate 55, and the condenser 39 is formed by a capacitance between the P-type region 57 and the metal layer 43. Further, though the transistors 34 and 35 in FIG. 8 are not shown in FIG. 12, they are formed in the same manner as formation of the transistor 38.

The embodiment in connection with FIG. 8 shows an example wherein the transistor used as a P-channel insulated-gate-field-effect transistor. All the transistors used may be constituted by N-channel insulated-gate-field-effect transistors for the purpose of the embodiment as in FIG. 8. In this case, it is necessary to establish signal relationships whose polarities are all reverse with respect to those shown in FIG. 9.

The embodiments as shown in FIGS. 4, 6 and 8 have been explained using insulated-gate-field-effect transistors for the gate circuit. It is needless to say that ordinary transistors or relay contacts may be employed instead of said field effect transistors.

What we claim is:

1. A condenser memory circuit comprising:

a condenser which stores information;

a data terminal for supplying information which is to be stored and receiving information which is stored;

an address instruction pulse-generating source which generates an address instruction pulse at writing-in and reading-out times;

a first P-channel insulated-gate-field-effect transistor connected between said condenser and said data terminal which is turned on by said address instruction pulse and stores the information from said data terminal in said condenser at the writing-in times of the information and reads out to the data terminal the stored charge from said condenser at the reading-out times of the information;

a regenerative instruction pulse generating source for generating a regenerative instruction pulse which is at least synchronized with said address instruction pulse;

an N-channel depletion mode insulated-gate-field-effect transistor rendered nonconducting when a stored charge is present in said condenser and connecting said regenerative instruction pulse-generating source to ground when said N-channel depletion mode insulated-gate-field-effect transistor is rendered conducting;

a regeneration voltage generating source whose voltage value substantially corresponds to the level of the information to be stored; and a second P-channel insulated-gate-field-effect transistor which is turned on in response to said regenerative instruction pulse only for the period in which said N-channel depletion mode insulated-gate-field-effect transistor is in the nonconducting stage and which connects said regeneration voltage generating source to said condenser.

2. A condenser memory circuit comprising:

a condenser which stores information;

a source for supplying information to be stored and receiving information which is stored;

a pulse-generating source which generates an address instruction pulse at writing-in and reading-out times of the information;

a first insulated-gate-field-effect transistor which is closed by said address instruction pulse and connects said information supply source to said condenser at the writing-in time of the information and reads out the stored charge from said condenser at the reading-out time of the information;

a regenerative instruction pulse generating source for generating a regenerative instruction pulse which is at least synchronized with said address instruction pulse;

a regeneration voltage-generating source whose voltage value substantially corresponds to said information to be stored;

a second insulated-gate-field-effect transistor connected to said regenerative instruction pulse-generating source which is turned on by said regenerative instruction pulse; and a third insulated-gate-field-effect transistor connected between said condenser and regeneration voltage-generating source, said third insulated-gate-field-effect transistor being turned on by said second insulated-gate-field-effect gate field effect transistor when both a charging voltage exists across said condenser and a regenerative instruction pulse is applied to said second insulated-gate-field-effect transistor.

3. A condenser memory circuit comprising:

a first condenser which stores information as an electric charge;

a data terminal for supplying information to be stored and receiving information which is stored;

an address instruction pulse-generating source which generates an address instruction pulse at writing-in and reading-out times of the information;

a first switching means which is closed by an address instruction pulse connecting said data terminal to said first condenser whereby said first condenser stores as an electric charge the information from said data terminal at writing-in time of the information and reads out the stored charge from said first condenser at reading-out time of the information; a regenerative instruction pulse generating source for generating a first regenerative instruction pulse which is at least synchronized with said address instruction pulse, and a second regenerative instruction pulse-generating source for generating a second regenerative instruction pulse which has a certain specific delay time relationship with said first regenerative instruction pulse; a second condenser which stores the same information as said first condenser;

a regeneration voltage-generating source whose voltage value substantially corresponds to the information to be stored in said first condenser;

a second switching means which is closed by said first regenerative instruction pulse and connects said first and second condensers in parallel with each other thereby effecting storage by said two condensers of the information from said information supply source;

third switching means which is closed by said second regenerative instruction pulse and connects said first and second condensers in series with each other; and, fourth switching means closed through control of the voltage present due to said second condenser storing charge applied while said third switching means is closed, and said fourth switching means of which is closed in said manner when a stored charge is present in said first condenser and said second regenerative instruction pulse is applied thereto, and said fourth switching means of which connects said regeneration voltage generating source to said first condenser; and, said condenser memory circuit characterized in that the stored charge is regenerated at each arrival of said regenerative instruction pulse when a stored charge is present in said first condenser.

4. A condenser memory circuit comprising:

first and second condensers which store information;

a source for supplying information to be stored and for receiving information which is stored;

an address instruction pulse-generating source which generates an address instruction pulse at writing-in and reading-out times of the information;

a first insulated-gate-field-effect transistor which is turned on by said address instruction pulse and connects said information supply source to said two condensers at the writing-in time of the information, and which reads out the stored charge from said first condenser at reading-out time of the information;

a first regenerative instruction pulse generating source which is at least synchronized with said address instruction pulse;

a second regenerative instruction pulse-generating source for generating a regenerative instruction pulse delayed a certain specific time behind said first regenerative instruction pulse;

second and third insulated-gate-field-effect transistors which are turned on by said first regenerative instruction pulse and connect said two condensers in parallel with each other;

a fourth insulated-gate-field-effect transistor which is turned on by said second regenerative instruction pulse and connects said two condensers in series with each other; and a fifth insulated-gate-field-effect transistor which is closed when a stored charge is present in said first condenser and said second regenerative instruction pulse is applied thereto, and which connects said regeneration voltage generating source to said first condenser.

5. A condenser memory circuit comprising:

a condenser for storing information in the form of an electric charge;

a first terminal for writing-in and reading-out information;

a second terminal for providing address instruction pulses;

a third terminal for providing a train of regenerative instruction pulses which is at least synchronized with the address instruction pulses;

a regeneration power source for providing a voltage whose value substantially corresponds to the level of electric charge of the information;

a first switch for connecting said condenser to said first terminal in response to application of the address instruction pulse to said first switch from said second terminal; and regeneration control means responsive to receipt of the regenerative instruction pulses from said third terminal for connecting said regeneration voltage generating source to said condenser only when a stored charge is present in said condenser.

6. A condenser memory circuit according to claim 5, wherein the regeneration control means comprise gating means for generating a gate output due to presence of the electric charge stored in said condenser when the regenerative instruction pulse is applied from said third terminal, and a second switch for connecting said regeneration power source to said condenser in response to application thereto of the gate output from said gating means.

7. A condenser memory circuit according to claim 6, wherein said gating means comprises a fourth switch which is closed by the regenerative instruction pulse, and means for applying the electric charge across said condenser to said second switch as the gate output when said fourth switch is closed.

8. A condenser memory circuit according to claim 7, wherein said first, second and fourth switches are insulated-gate-field-effect transistors of the same conductivity type.

9. A condenser memory circuit according to claim 6, wherein said gating means comprises a third switch which is opened by the electric charge stored in said condenser, and means applied with the regenerative instruction pulse from the third terminal for applying the regenerative instruction pulse to said second switch as the gate output when said third switch is opened.

10. A condenser memory circuit according to claim 9, wherein said second and third switches are insulated-gate-field-effect transistors of opposite conductivity type.

11. A condenser memory circuit according to claim 9, wherein said first and second switches are P-channel insulated-gate-field-effect transistors and said third switch is an N-channel depletion mode insulated-gate-field-effect transistor.

* * * * *